Reissued Dec. 20, 1949

Re. 23,184

UNITED STATES PATENT OFFICE 23,184

PRECOATED MATERIAL AND DRY LUBRICATING COATING COMPOSITION THEREFOR

Roland A. Whitbeck, Lorain, Ohio, assignor to Gilron Products Company, Cleveland, Ohio, a corporation of Ohio No Drawing. Original No. 2,470,062, dated May 10, 1949, Serial No. 53,591, October 8, 1948. Application for reissue October 5, 1949, Serial No. 119,745

19 Claims. (Cl. 252—18)

Matter enclosed in heavy brackets [ ] appears in the original patent but forms no part of this reissue specification; matter printed in italics indicates the additions made by reissue

This invention relates to a new article of manufacture and to a new and improved combination lubricating and protecting composition for metal bars, rods, and sheets, and to a composition for forming such a coating thereon.

The present composition more particularly relates to the type of lubricant commonly referred to as "dry lubricant" and is applied in wet condition to the metal stock and caused, or permitted, to dry thereon, thereby forming on the stock a dry coating or film after which the dry coated stock is subjected to pressure die forming operations without the addition of other lubricating and cooling agents.

For the purposes of illustration, the present invention is described as applied in the deep drawing of sheet steel and steel alloys in pressure dies, for which it is particularly adapted, its application to the drawing, stamping and shaping of other kinds of sheet and rod stock being apparent from the illustrative example.

Heretofore, blank steel stock for subsequent forming operations has been shipped from the mill to the customer after the final cleaning at the mill. However, it is desirable that the surface of the metal be protected during shipment. Also it is desirable that, at the fabrication or forming site, the metal be lubricated properly at the time of use. Usually it is necessary to cleanse the metal at the fabricating or forming site just prior to use to remove foreign substances which have accumulated thereon during shipment.

It is necessary also to use a lubricant during fabrication and forming and such lubricant must be adapted for the particular type of operation to be performed on the metal.

The small manufacturer seldom has available the proper equipment for these cleaning and lubricating operations and usually does not have knowledge of the particular lubricant which should be used, the manner of handling, the amount to be used, etc., particularly in those plants of which most of the metal used is ordinary steel.

Again, it is not economical to purchase cleaners and lubricants in small quantities for occasional jobs.

If the small manufacturer fails to use properly cleaned metal and to lubricate it properly, the damage and wear on dies, the high percentage of rejects, the finished pieces which prove defective in use more than offset his profit. These problems are especially pronounced now that so many different types of alloys are specified for various items that sound advice on their use is available only from experts in the various metal and lubricating fields. The small company cannot afford such advice and small occasional orders do not justify the mill in investigating the specific problems of each small buyer.

The principal object of the present invention is to make available to the small user the proper metal for his particular need in condition for his use in the form in which it is received from the mill and to free him from the burden of proper cleaning and lubricating of the metal.

A more specific object is to provide as an article of manufacture, blank stainless steel stock for subsequent forming operations which is precoated with a permanent self-adherent dry film of material which protects the metal and lubricates it properly, whereby it may be formed efficiently by dies, presses and the like as received from the mill.

Another object is to provide a composition which is adapted to provide a coating of the character heretofore described.

Other objects and advantages will become apparent from the following specification.

After metal, particularly steel, stainless steel, and steel alloys, is milled in accordance with known procedures, it is subjected to the final steps which usually include pickling and cleaning. Immediately following these final steps and while the surface of the metal is clean and bright, the metal is coated with a combined protective and lubricating coating, then, in the case of wire, rod or band stock, is coiled, or, in the case of sheet stock, is stacked.

The composition of the present invention comprises essentially borax and water soluble high titre soap, preferably tallow or palm oil soap, or a combination thereof, and preferably having a melting point of from 36 to 42, *that is, the melting point of the saponifiable, mixed fatty acid content of the soap is preferably from about 36°-42° C.*

The proportions of the ingredients of the dry mix which are the active lubricating ingredients of my invention are as follows, the percentage given being by weight:

| | Preferred | Range |
|---|---|---|
| | *Per cent* | *Per cent* |
| Water-soluble high titre soap | 15-20 | 10-33 |
| Borax | 85-80 | 90-67 |

The composition is dissolved in water in an amount ranging from one ounce of the dry mix to thirty ounces of the dry mix per gallon of water, depending upon the particular characteristics of the stock, dies and draw. The resultant solution is applied to the stock to be drawn in any suitable manner such, for example, as by dipping, after which the coated stock is permitted to dry or is dried by the application of heat so as to form on the stock a dry, homogeneous, self-adherent, lubricating film which is very tenacious and which remains on the stock under normal storage conditions, both protecting it during storage and providing all the lubricant that is necessary when the stock is subsequently drawn.

An increase in the soap content above the lower limit provides better lubrication at lower temperatures and pressures whereas an increase in the borax content provides better lubrication at the higher pressures and temperatures.

On the other hand, an excess of soap over that required for a particular draw may result in charring of the excess on the surfaces of the metal article and dies with well known disadvantages attendant upon such a condition. An excess of soap above the upper limit recited results in a tacky coating or film having low or little adherence to the stock.

An excess of borax for a particular draw produces a film which is apt to flake off, or fail to operate properly in that the stock, because of lack of lubrication initially, becomes scored before a high enough pressure and temperature are reached to render the borax fully operative.

An excess of borax above the upper limit recited results in coating which is dusty, or causes a dusty condition in the dies, and which has insufficient plasticity and adherence.

Many coexisting factors must be considered in choosing the proportions of ingredients in the dry mix and the density of the solution for a given draw.

These include, for example, the type of metal, its thickness, surface condition, ductility and other physical characteristics; the type of dies, die tolerance or clearance and surface or finish; and the depth and complexity of the draw.

In general, for stock having a high polish or mirror finish and for stainless steels a very thin coating is required. Deep draws and resultant high pressures and temperatures usually indicate a higher borax to soap ratio than lighter draws and lower temperatures and pressures. Rough surface or heavy tooth stock requires a relatively thick coat in that the surface cavities of the stock as well as the surface projections should be well coated. New dies or dies with close clearance require a thinner film than older dies or dies with more clearance. The thinnest coating consistent with proper lubrication is desirable.

Accordingly, for the thinnest films, such as used for highly polished or stainless steels, the dry mix is used in an amount of about two ounces per gallon of water. For the coarsest films, such as used for rough finished stock, the dry mix may be used in an amount as high as thirty ounces per gallon. A few trials with any particular stock of steel or other metal in the particular dies to be used will demonstrate the film thickness and soap to borax ratio that may be used for optimum results for the particular metal and draw.

Having described in detail the nature of my active lubricating ingredients and how such materials function, it therefore becomes convenient to list a few specific examples illustrative of my invention, the percentages being given by weight:

Example 1

| | Per cent |
|---|---|
| Tallow soap | 15 |
| Borax | 85 |

Example 2

| | Per cent |
|---|---|
| Palm oil soap | 18 |
| Borax | 82 |

Example 3

| | Per cent |
|---|---|
| Tallow soap | 24 |
| Borax | 76 |

Example 4

| | Per cent |
|---|---|
| Tallow soap | 10 |
| Palm oil soap | 6 |
| Borax | 84 |

Example 5

| | Per cent |
|---|---|
| Palm oil soap | 20 |
| Borax | 80 |

In some instances it is desirable to use a relatively heavy film and yet a limited amount of lubricant. For example, on rough surface or heavy tooth porous stock, a relatively thick film is required in order to cover the sheet properly and this film normally would be in excess of the requirements of lubricant. Again, where storage facilities or the particular locale at which the metal is to be stored is apt to be damp, extra precautions may be taken to assure proper film tenacity. In either of such instances a small amount of starch or a comparable binder may be added to the dry mix. Any starch such as, for example, cornstarch, potato starch, wheat starch, etc., or equivalent material may be used as a binder inasmuch as it serves only the mechanical function of retaining the lubricants in place and itself does not operate as a lubricant. For example, the combined coating may comprise the following dry mix by weight and is applied in an aqueous solution in an amount of about one pound of the dry mix per gallon of water:

| | Preferred | Range |
|---|---|---|
| | *Per cent* | *Per cent* |
| Starch, or other equivalent binder | 5 | 1-8 |
| Water-soluble high titre soap, preferably tallow or palm oil soap | 25 | 15-25 |
| Borax | 70 | 84-67 |

Thus if the starch is used in a maximum of 8% and the soap in an amount of 25%, the amount of borax would be reduced to the lowest minimum limit of 67%, whereas if the starch were maintained at the minimum of 1% and the soap at a minimum of 15%, the borax would be used in the amount of 84% which is below the maximum of 90% when no binder is employed. In other words, when a binder is employed the concentration of the soap and borax is adjusted so as to account for the 1% to 8% concentration of starch. However, this adjustment is such that the soap and borax concentration is well within the broad ranges hereinbefore given and may be employed without starch. The coating is applied by dipping the metal in an aqueous solution and then drying the metal in air.

If the starch content is increased, the coating tends to become more viscous but is heavy and tends to sag. If the starch content is decreased, the adhesion of the coating is reduced. If the soap is increased, a more satisfactory coating for short draws is provided because of the low melting point. If the soap is decreased, the coating is more satisfactory for longer draws as soap tends to break down and carbonize under the resultant increased heat of longer draws.

By applying the coating promptly after production of the metal, a better surface for the combined protective and lubricating coating is provided so that the coating cannot only adhere better but can lubricate more effectively and uniformly. This may be due to the higher surface porosity of clean, raw, newly produced metal, to absence of oxide films, and to the cleanliness of the fresh surface generally. In any event, best results are obtained by applying the coating at the mill promptly upon completion of production of the final metal.

After coiling or stacking, it is desirable to wrap the metal to protect it from mechanical abrasion and the like and other hazards of shipment.

Metal prepared in this manner is in exceptionally fine condition when received at the forming plant and can be used without other lubricant as received. It can be stored for long periods without deterioration or damage or undesirable effects on the lubricating action of the coating.

The material, when applied, forms a permanent self-adherent, dry, homogeneous, lubricating film which might be termed amorphous or micro-crystalline and which also protects the metal to which it is applied during shipment and during storage.

This coating works satisfactorily and efficiently in metal stamping, press forming, wire and die drawing, and fabricating, and other operations. The word "forming" as used in the appended claims is meant to include all such metal working operations and such others as are currently practiced.

In some cases alkali metal salts, phosphate and acid salts, or, for example, boric acid, can be used instead of the borax but their advantages are not as great and they are slightly hygroscopic so that permanent and effective adherence of the coating cannot be depended on as fully under all conditions of storage.

After forming the stock with the coating thereon, the stock can be cleaned readily by washing in hot water as all of the lubricating ingredients are water-soluble. Thus the very difficult and expensive steps of removing the oil and grease residues of conventional oil and grease lubricants are eliminated.

By the term "consisting essentially of" as used herein in defining the coating composition or film, it is meant to define a composition or film containing the claimed ingredients, in the relative proportions stated as the possible and actual constituents of the composition or film, but it is not meant to exclude the presence of minor amounts of conventional compounds or ingredients, the use of which is common practice in the lubrication of metals during forming operations.

*In the specification and claims, "melting point" is used in the usual sense to mean the melting point of the saponifiable mixed fatty acid content of soaps and the numerical ranges recited are temperatures in degrees Centigrade.*

This application is a continuation-in-part of my application Serial No. 625,113, filed October 27, 1945, now abandoned.

Having thus described my invention, I claim:

1. As an article of manufacture, a piece of blank metal stock for subsequent forming operations coated with a permanent, self-adherent dry homogeneous lubricating and protecting film, said film consisting essentially of the following ingredients by weight:

| | Per cent |
|---|---|
| Water-soluble high titre soap having a melting point of from about 36 to 42 | 10 to 33 |
| Borax | 90 to 67 |

2. As an article of manufacture, a piece of blank metal stock for subsequent forming operations coated with a permanent, self-adherent dry homogeneous lubricating and protecting film, said film consisting essentially of the following ingredients by weight:

| | Per cent |
|---|---|
| Water-soluble high titre tallow soap | 10 to 33 |
| Borax | 90 to 67 |

3. As an article of manufacture, a piece of blank metal stock for subsequent forming operations coated with a permanent, self-adherent dry homogeneous lubricating and protecting film, said film consisting essentially of the following ingredients by weight:

| | Per cent |
|---|---|
| Water-soluble high titre palm oil soap | 10 to 33 |
| Borax | 90 to 67 |

4. As an article of manufacture, a piece of blank metal stock for subsequent forming operations coated with a permanent, self-adherent dry homogeneous lubricating and protecting film, said film consisting essentially of the following ingredients by weight:

| | Per cent |
|---|---|
| Water-soluble high titre soap having a melting point of from 36 to 42 | 15 to 20 |
| Borax | 85 to 80 |

5. A coating material for admixture with water for coating a piece of blank metal stock and forming thereon a permanent, self-adherent dry homogeneous lubricating and protecting film consisting essentially of the following ingredients by weight:

| | Per cent |
|---|---|
| Water-soluble high titre soap having a melting point of from about 36 to 42 | 10 to 33 |
| Borax | 90 to 67 |

6. A coating material for admixture with water for coating a piece of blank metal stock and forming thereon a permanent, self-adherent dry homogeneous lubricating and protecting film consisting essentially of the following ingredients by weight:

| | Per cent |
|---|---|
| Water soluble high titre soap having a melting point of from about 36 to 42 | 15 to 20 |
| Borax | 85 to 80 |

7. As an article of manufacture, a piece of blank metal stock for subsequent forming operations coated with a permanent, self-adherent dry homogeneous lubricating and protecting film, said film consisting essentially of the following ingredients by weight:

| | Per cent |
|---|---|
| Starch | 1 to 8 |
| Water-soluble high titre soap having a melting point of from 36 to 42 | 15 to 25 |
| Borax | 84 to 67 |

8. A coating material for admixture with water for coating a piece of blank metal stock and forming thereon a permanent, self-adherent dry homogeneous lubricating and protecting film consisting essentially of the following ingredients by weight:

| | Per cent |
|---|---|
| Starch | 1 to 8 |
| Water-soluble high titre soap having a melting point of from 36 to 42 | 15 to 25 |
| Borax | 84 to 67 |

9. As an article of manufacture, a piece of blank metal stock for subsequent forming operations coated with a permanent, self-adherent dry homogeneous lubricating and protecting film, said film consisting essentially of the following ingredients, by weight:

| | Per cent |
|---|---|
| Cornstarch | 1 to 8 |
| Water soluble tallow soap | 15 to 25 |
| Borax | 84 to 67 |

10. As an article of manufacture, a piece of blank metal stock for subsequent forming operations coated with a permanent, self-adherent dry homogeneous, lubricating and protecting film, said film consisting essentially of the following ingredients by weight:

| | Per cent |
|---|---|
| Cornstarch | about 5 |
| Water soluble tallow soap | about 25 |
| Borax | 70 |

11. A coating material for admixture with water for coating a piece of blank metal stock and forming thereon a permanent, self-adherent dry homogeneous lubricating and protecting film consisting essentially of the following ingredients, by weight:

| | Per cent |
|---|---|
| Cornstarch | about 5 |
| Water soluble tallow soap | about 25 |
| Borax | 70 |

12. As an article of manufacture, a piece of blank metal stock for subsequent forming operations coated with a permanent, self-adherent dry homogeneous lubricating and protecting film, said film consisting essentially of the following ingredients, by weight:

| | Per cent |
|---|---|
| Starch | 1 to 8 |
| Water soluble tallow soap | 15 to 25 |
| Borax | 84 to 67 |

13. A coating material for admixture with water for coating a piece of blank metal stock and forming thereon a permanent, self-adherent dry homogeneous lubricating and protecting film consisting essentially of the following ingredients, by weight:

| | Per cent |
|---|---|
| Starch | 1 to 8 |
| Water soluble tallow soap | 15 to 25 |
| Borax | Balance |

14. A coating material for admixture with water for coating a piece of blank metal stock and forming thereon a permanent, self-adherent dry homogeneous lubricating and protecting film consisting essentially of the following ingredients by weight:

| | Per cent |
|---|---|
| Mixture of water-soluble high titre tallow soap and water soluble high titre palm oil soap, totaling | 10–33 |
| Borax | 90–67 |

15. As an article of manufacture, a piece of blank metal stock for subsequent forming operations coated with a permanent, self-adherent dry homogeneous lubricating and protecting film, said film consisting essentially of the following ingredients by weight:

| | Per cent |
|---|---|
| Mixture of water-soluble high titre tallow soap and water soluble high titre palm oil soal, totaling | 10–33 |
| Borax | 90–67 |

16. A coating material for admixture with water for coating a piece of blank metal stock and forming thereon a permanent, self-adherent dry homogeneous lubricating and protecting film consisting essentially of the following ingredients by weight:

| | Per cent |
|---|---|
| Water-soluble high titre tallow soap | 10–33 |
| Borax | 90–67 |

17. A coating material for admixture with water for coating a piece of blank metal stock and forming thereon a permanent, self-adherent dry homogeneous lubricating and protecting film consisting essentially of the following ingredients by weight:

| | Per cent |
|---|---|
| Water-soluble high titre palm oil soap | 10–33 |
| Borax | 90–67 |

*18. A coating material for admixture with water for coating a piece of blank metal stock and forming thereon a permanent, self-adherent dry homogeneous lubricating and protecting film consisting essentially of the following ingredients by weight:*

| | *Per cent* |
|---|---|
| *Water-soluble high titre soap having a melting point of at least about 36* | *10 to 33* |
| *Borax* | *90 to 67* |

*19. As an article of manufacture, a piece of blank metal stock for subsequent forming operations coated with a permanent, self-adherent dry homogeneous lubricating and protecting film, said film consisting essentially of the following ingredients by weight:*

| | *Per cent* |
|---|---|
| *Water-soluble high titre soap having a melting point of at least about 36* | *10 to 33* |
| *Borax* | *90 to 67* |

ROLAND A. WHITBECK.

REFERENCES CITED

The following references are of record in the file of this patent:

UNITED STATES PATENTS

| Number | Name | Date |
|---|---|---|
| 2,074,224 | Johnson | Mar. 16, 1937 |
| 2,469,473 | Orozco | May 10, 1949 |